United States Patent [19]

Tanji

[11] Patent Number: 5,748,258
[45] Date of Patent: May 5, 1998

[54] APPARATUS AND METHOD FOR PROCESSING A VIDEO SIGNAL

[75] Inventor: Ichiro Tanji, Kanagawa, Japan

[73] Assignee: Sony Corporation, Tokyo, Japan

[21] Appl. No.: 575,389

[22] Filed: Dec. 20, 1995

[30] Foreign Application Priority Data

Dec. 28, 1994 [JP] Japan .................................. 6-339564

[51] Int. Cl.$^6$ .................................................. H04N 5/208
[52] U.S. Cl. .......................... 348/625; 348/629; 348/627; 348/678
[58] Field of Search .................................. 348/627, 678, 348/625, 629, 613, 628; H04N 5/14, 5/208

[56] References Cited

U.S. PATENT DOCUMENTS

| | | | |
|---|---|---|---|
| 4,991,012 | 2/1991 | Yoshino | 358/183 |
| 4,994,915 | 2/1991 | Takahashi et al. | 348/625 |
| 5,247,361 | 9/1993 | Izawa et al. | 348/625 |
| 5,432,563 | 7/1995 | Kasahara | 348/629 |
| 5,479,215 | 12/1995 | Chmielewski et al. | 348/627 |

FOREIGN PATENT DOCUMENTS

| | | | |
|---|---|---|---|
| 0 354 842 A1 | 2/1990 | European Pat. Off. | |
| 2-94874 | 5/1990 | Japan | H04N 5/208 |

*Primary Examiner*—Glenton B. Burgess
*Attorney, Agent, or Firm*—Frommer Lawrence & Haug LLP; William S. Frommer

[57] ABSTRACT

Video signal processing apparatus and method which generates an aperture correction signal, or detail signal, which has a narrow width even for video signals that have low high frequency components. The processing apparatus generates a standard detail signal from the video signal, detects the maximum amplitude level of plural samples of the detail signal, and modifies the amplitude level of one of those samples as a function of the ratio of the sample's amplitude level to the detected maximum amplitude level. The apparatus further properly modifies the detail signal even when the positive and negative maximum amplitudes of the video signal are substantially different.

40 Claims, 9 Drawing Sheets

[RATIO OF PEAK POINT TO AMPLITUDE]

APPARATUS AND METHOD FOR PROCESSING A VIDEO SIGNAL

BACKGROUND OF THE INVENTION

The present invention relates to apparatus and method for processing a video signal and, more particularly, to apparatus and method for generating an improved aperture correction signal from a video signal.

As is known, image enhancement devices produce aperture correction signals, or "DTL" (or detail signals, as used herein) to improve the horizontal definition of a broadcast signal so that outlines (i.e., contours) in a video image are maintained. FIG. 1 is an exemplary prior art device which produces a DTL signal. An optical image is supplied to a camera 20 which converts the image to an analog video signal which is converted to a digital video signal in analog-to-digital (A/D) converter 22. High pass filter 24 extracts a high frequency component of the digital video signal to produce the detail (DTL) signal. Normally, aperture correction utilizing the generated DTL signal produces a signal waveform such a shown in FIG. 2A, and would produce a video image with appropriately thin-outlined objects, such as shown in FIG. 3A.

One difficulty encountered in typical image enhancement devices is their general inability to maintain the proper contour of objects in a video image when the transmitted (or received) frequency components of the objects are relatively low. In such cases, the output of high pass filter 24 would include lower frequency component signals that have relatively wide widths, as shown in FIG. 2B, and which would produce a video image with relatively thick-outlined objects, such as shown in FIG. 3B. In other words, since the frequency of the contour is low, only a "thick" contour can be generated. For example, when a brightness (i.e., luminance) signal having a frequency band of 0 to 4.2 MHz or a frequency band of 0 to 5 MHz is boosted (i.e., aperture corrected) to add a contour to the signal, that added contour is too thick to produce a satisfactory image.

OBJECTS OF THE INVENTION

Therefore, it is an object of the present invention to provide apparatus and method for processing a video signal which overcome the shortcomings of the above-described device.

Another object of the present invention is to provide apparatus and method for processing a video signal which properly controls the thickness of a contour.

A further object of the present invention is to provide a signal processing technique which adjusts a detail signal of a video signal independent of its frequency.

An additional object of this invention is to independently modify positive and negative samples of a detail signal.

Various other objects, advantages and features of the present invention will become readily apparent to those of ordinary skill in the art, and the novel features will be particularly pointed out in the appended claims.

SUMMARY OF THE INVENTION

In accordance with one embodiment of the present invention, apparatus and method are provided for generating a detail signal (e.g., using a high pass filter) from a video signal, detecting the maximum amplitude level of plural samples of the detail signal, and modifying the amplitude level of one of those samples as a function of the ratio of the sample's amplitude level to the detected maximum amplitude level. The modified detail signal then is combined with the original video signal.

As one aspect of the present invention, the modified detail signal is combined with the original detail signal at a selectable ratio of one to the other.

As another aspect of the present invention, the maximum amplitude level of a predetermined constant number of adjacent samples, including the modified sample, is detected.

In accordance with another embodiment of the present invention, apparatus and method are provided for generating a detail signal from a video signal, detecting the maximum positive amplitude level of a set of positive samples, detecting the maximum negative amplitude level of a set of negative samples, determining the sign of a sample to be modified, and modifying the amplitude level of that sample as a function of the ratio of the sample's amplitude level to the detected maximum positive amplitude level or to the detected maximum negative amplitude level depending on the sign of the sample.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

Figure 1:
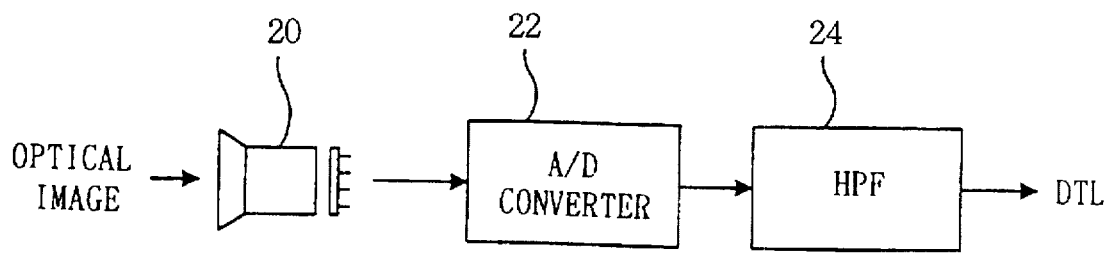
FIG. 1 is a block diagram of a prior art detail signal generating device.
Figure 2A:
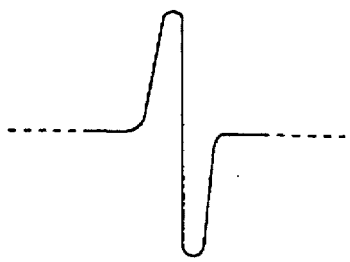
FIGS. 2A and 2B are signal waveforms of a high frequency component of a video signal.
Figure 2B:
Figure 3A:
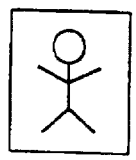
FIGS. 3A and 3B are pictorial representations of two different aperture-corrected video signals.
Figure 3B:
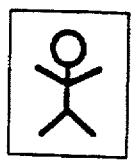
Figure 4:
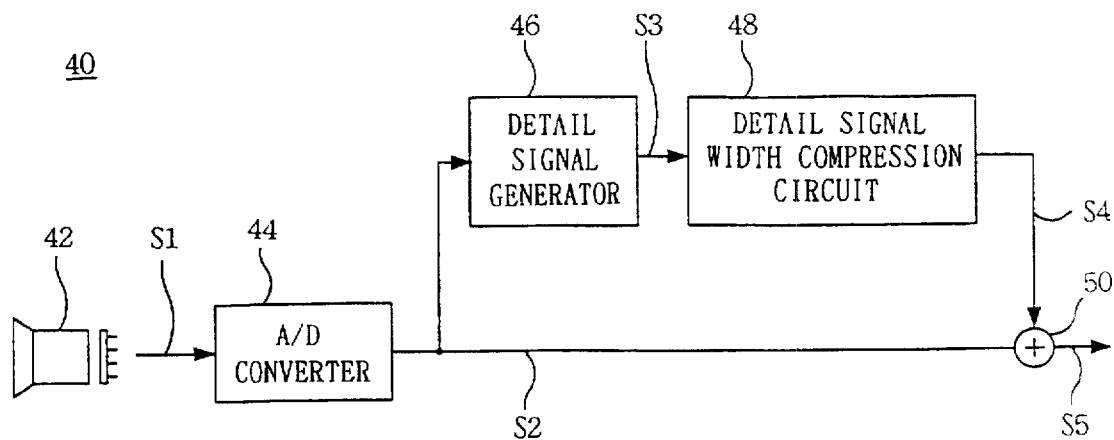
FIG. 4 is a block diagram of a video signal processing apparatus in accordance with the present invention.

Referring now to FIG. 4 of the drawings, a video signal processing apparatus in accordance with the present invention is shown. A video camera 42 "picks up" an optical image and supplies the optical image as video signal S1 to A/D converter 44 which converts the video signal to a digital video signal S2. Digital video signal S2 is supplied to a detail signal generator 46 and to an adder 50. Detail signal generator 46 may be a high pass filter and extracts a high frequency component signal from digital video signal S2 and supplies the extracted high frequency component signal to a detail signal width compression circuit 48 as detail (DTL) signal S3. Since the generation of a detail signal is well known in the art, further description thereof is herein omitted except where necessary for an understanding of the present invention.

Detail signal width compression circuit 48 operates to compress the width of detail signal S3 without regard to its frequency, as further discussed below, and supplies the width compressed detail signal as a shaped (or modified) detail signal S4 to adder circuit 50. Adder circuit 50 then adds or combines the original digital video signal S2 and the shaped detail signal S4 to produce aperture-corrected video signal S5.

Figure 5:
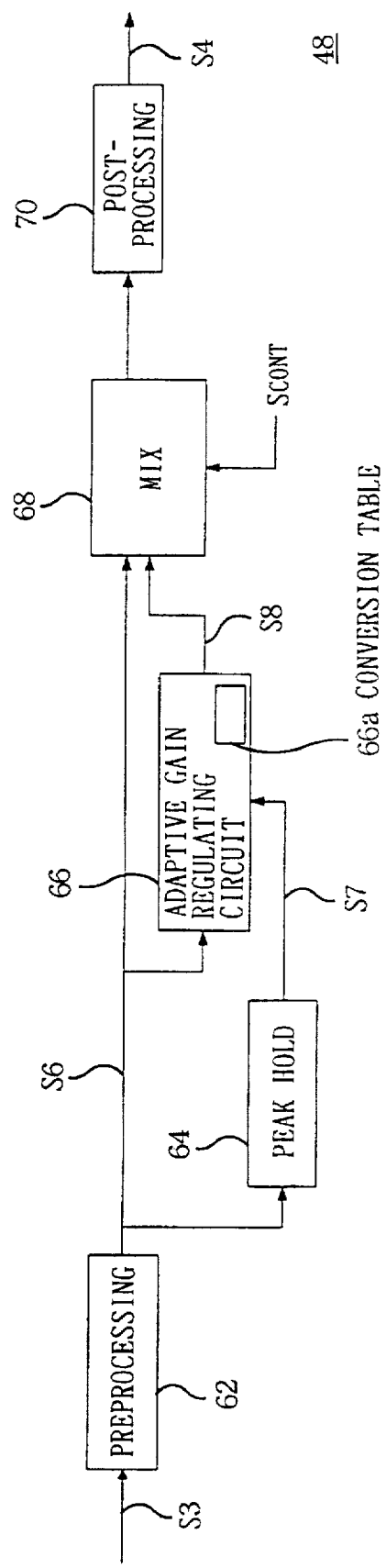
FIG. 5 is a block diagram of the detail signal width compression circuit of FIG. 4 in accordance with the present invention.

FIG. 5 illustrates a detailed block diagram of detail signal width compression circuit 48 in accordance with the present invention. As shown, width compression circuit 48 includes a preprocessing circuit 62, a peak hold circuit 64, an adaptive gain regulating circuit 66, a mixing circuit 68, and a postprocessing circuit 70. Detail signal S3 is supplied to preprocessing circuit 62 which converts the detail signal from a two's-complement format to a sign-magnitude format in which the sign of the amplitude is indicated as a separate bit (e.g., 0=positive, 1=negative) which is combined with the absolute value of the amplitude of a given sample of detail signal S3. The converted detail signal S6 is supplied to peak hold circuit 64, adaptive gain regulating circuit 66 and mixing circuit 68.

Figure 6A:
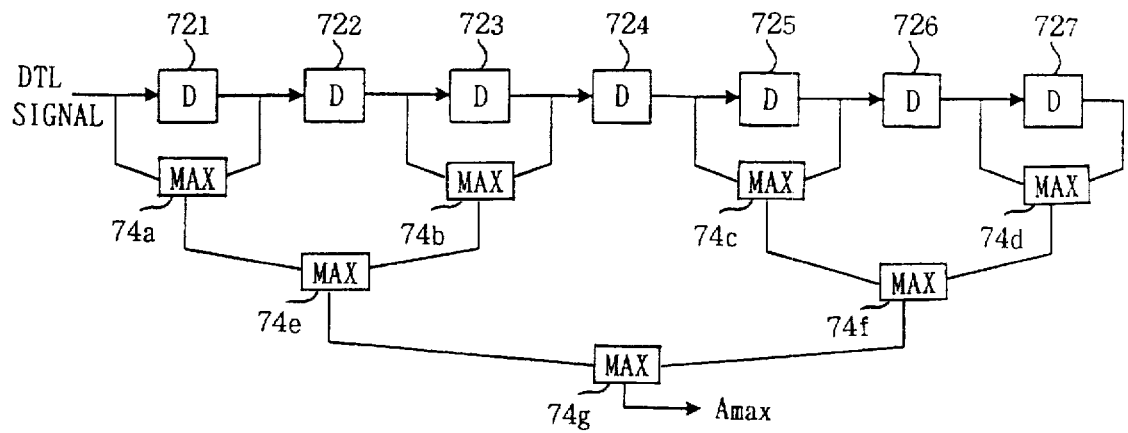
FIG. 6A is a functional block diagram of the peak hold circuit of FIG. 5.
Figure 6B:
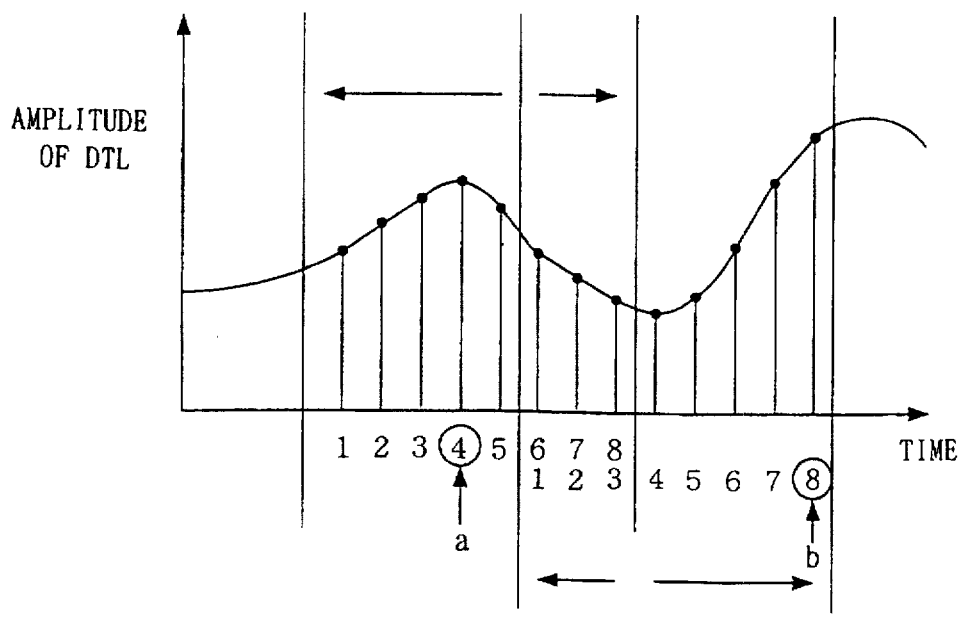
FIG. 6B is a waveform-timing diagram useful for the understanding of the operation of the peak hold circuit of FIG. 5.

Peak hold circuit 64 detects the maximum absolute amplitude value of plural successive samples of signal S6 and supplies the detected maximum amplitude value to adaptive gain regulating circuit 66 as peak value signal S7. FIG. 6A is an exemplary functional block diagram of peak hold circuit 64 which, as shown, includes a number of delay elements, 72$_1$, 72$_2$, . . . 72$_7$, and a number of comparing circuits, 74$_a$, 74$_b$, . . . 74$_g$. Signal S6 (i.e., the formatted DTL signal) passes through the delay elements which supplies eight successive samples to the comparing circuits to identify the maximum absolute amplitude value A$_{max}$ of the supplied samples. Maximum amplitude value A$_{max}$ is determined each time a new sample is supplied to peak hold circuit 64. Alternatively, maximum amplitude value A$_{max}$ is determined after plural samples of detail signal S6 are supplied to peak hold circuit 64. For example, FIG. 6B illustrates a timing diagram in which the amplitude level of a sample "a" is the detected maximum amplitude level during a first indicated time period and the amplitude level of a sample "b" is the detected maximum amplitude level during a second indicated time period. It is seen, therefore, that peak hold circuit 64 supplies the maximum amplitude level S7 (A$_{max}$) of a "window" of samples of detail signal S6. In the preferred embodiment, the maximum amplitude level signal S7 represents the maximum amplitude of a currently supplied sample of detail signal S6 (and which also is being supplied to circuit 66) and the preceding seven samples of detail signal S6.

Referring again to FIG. 5, adaptive gain regulating circuit 66 receives a sample of detail signal S6 and also receives peak value signal S7 and adjusts the amplitude of the sample as a function of the magnitude of the amplitude level of that signal to the maximum level represented by signal S7. That is, adaptive gain regulating circuit 66 ascertains the ratio of the amplitude level of the supplied sample to the supplied maximum amplitude level and adjusts the amplitude level of the sample using the conversion table shown in FIG. 7 (table 66a). For example, when the amplitude level of the sample equals the maximum amplitude level S7, the ratio is 1 (or "P" in FIG. 7) which results in no change in the sample's amplitude level. But if the sample's amplitude level is, for example, half the maximum amplitude level ("P/2" in FIG. 7), adaptive gain regulating circuit 66 reduces the sample's amplitude level by a factor of approximately three-fourths. Thus, conversion table 66a stores the appropriate coefficient data to facilitate the gain-adjusting of a sample by adaptive gain regulating circuit 66. The "gain-adjusted" detail signal is supplied to mixing circuit 68 as signal S8.

Figure 8A:
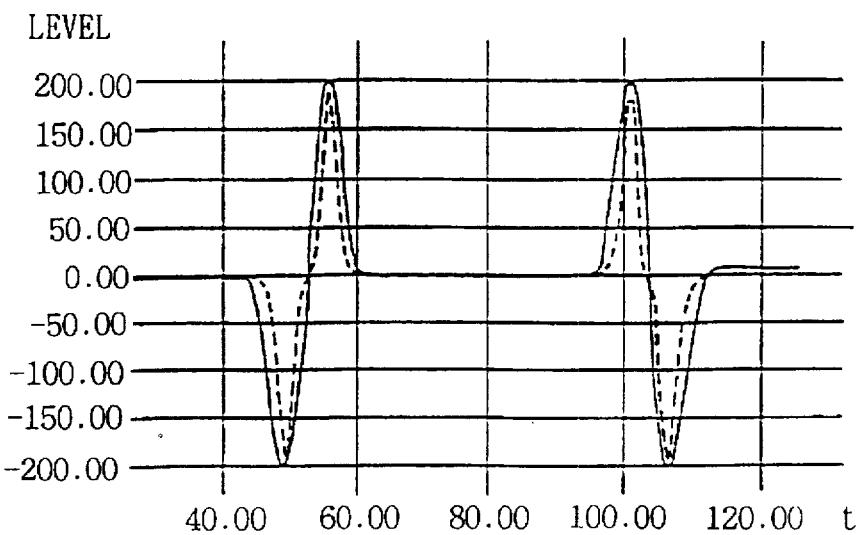
FIGS. 8A and 8B are waveform diagrams of a modified detail signal and a modified video signal, respectively, in accordance with the present invention.

FIG. 8A is a waveform diagram illustrating both detail signal S3 (also signal S6), as the solid-lined waveform, and gain-adjusted signal S8, shown as the dashed-lined waveform. It is seen that the original detail signal is relatively wide at the aperture compared to the width of the gain-adjusted detail signal.

Figure 9A:
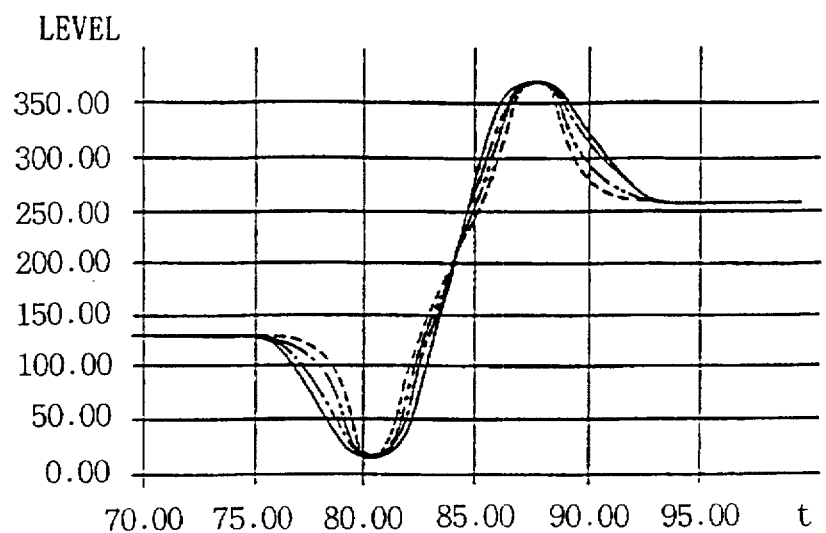
FIGS. 9A and 9B are waveform diagrams of another modified detail signal and another modified video signal, respectively, in accordance with the present invention.

Gain-adjusted detail signal S8 is supplied to mixing circuit 68 which combines (or "mixes") the gain-adjusted signal and detail signal S6 at a selectable ratio of one to the other as indicated by a control signal S$_{CONT}$. When signal S$_{CONT}$ is, for example, small, the output of mixing circuit 68 is similar to gain-adjusted signal S8 (whose aperture width is thin), and when signal S$_{CONT}$ is large, the output of mixing circuit 68 resembles detail signal S6 (whose aperture is wide). FIG. 9A illustrates resultant waveform diagrams of various combinations of detail signal S6 and gain-adjusted signal S8 for various values of S$_{CONT}$. As shown, the dashed line represents when only gain-adjusted signal S8 is supplied from mixing circuit 68, the dot-dashed waveform represents when mixing circuit 68 combines gain-adjusted signal S8 and detail signal S6 at the ratio of approximately 3:1, the dot-dot-dashed line represents when mixing circuit 68 mixes gain-adjusted signal S8 and detail signal S6 at the ratio of approximately 1:3, and the solid line represents when mixing circuit 68 supplies detail signal S6 as the output.

Mixing circuit 68 supplies the combined signal to postprocessing circuit 70 which converts the signal from sign-magnitude format to the two's-complement format and supplies the converted signal as width compressed detail signal S4 to adder circuit 50 (FIG. 4), and, as previously discussed, adder circuit 50 combines the original digital video signal S2 and width compressed detail signal S4 to produce video signal S5.

Figure 8B:
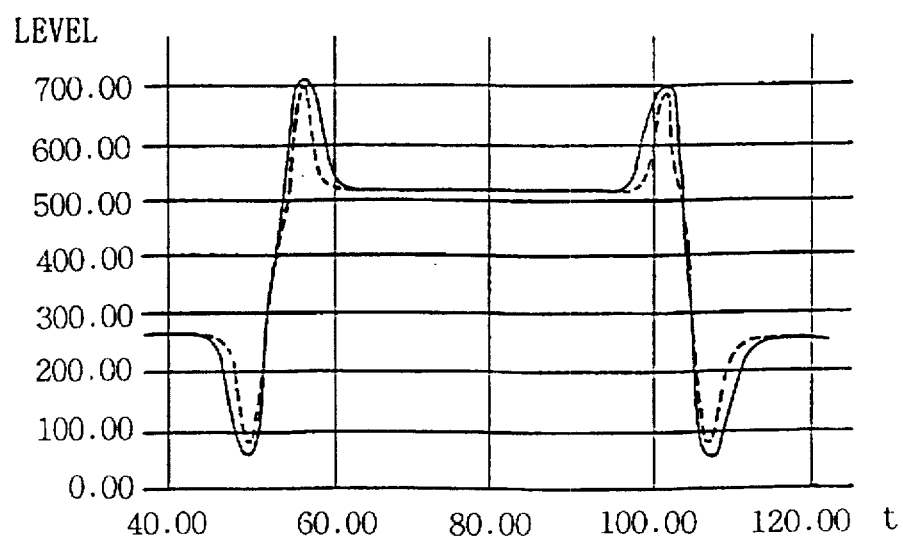
Figure 9B:
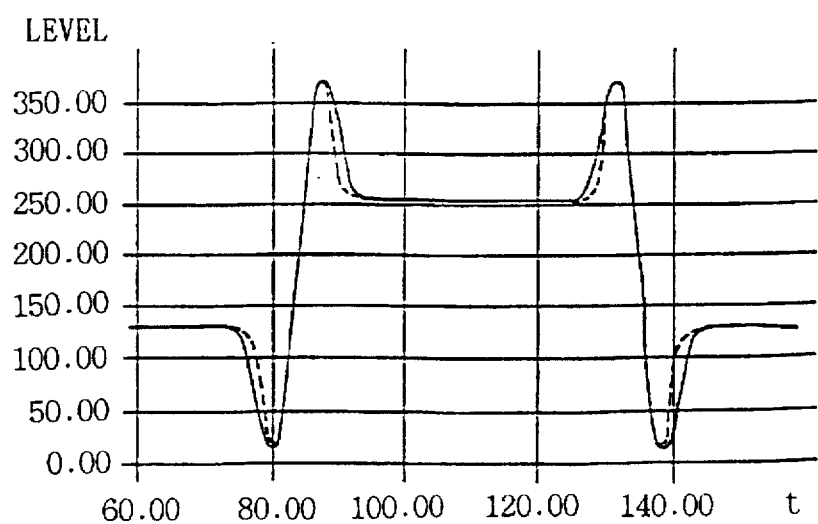

FIG. 8B shows two different waveform diagrams of video signal S5 in which the first waveform diagram, illustrated as the solid line, represents signal S5 when mixing circuit 68 supplies detail signal S6 as an output and it is seen that the apertures of this waveform are relatively wide. The second waveform of FIG. 8B, shown as the dashed line, represents video signal S5 when mixing circuit 68 supplies gain-adjusted signal S8 to postprocessing circuit 70. However, when mixing circuit 68, in response to control signal S$_{CONT}$, varies the mixing ratio of detail signal S6 and gain-adjusted signal S8, the width of the aperture of the waveform is further adjusted, such as shown as the dashed waveform in FIG. 9B. It is seen that this waveform, when compared to the solid-line waveform (which represents signal S5 when mixing circuit 68 supplies detail signal S6 as an output) can be fully controlled to provide the desired contour.

From the foregoing, it is seen that a narrow detail signal can be generated, even when the frequency of a signal component to be amplified is low, by detecting the maximum amplitude of a "window" of samples, determining the ratio of a sample amplitude to the maximum amplitude, gain-adjusting smaller amplitudes (when compared to the maximum amplitude level) more than larger amplitudes, and varying the mixing of the original detail signal and the gain-adjusted detail signal.

Figure 10:
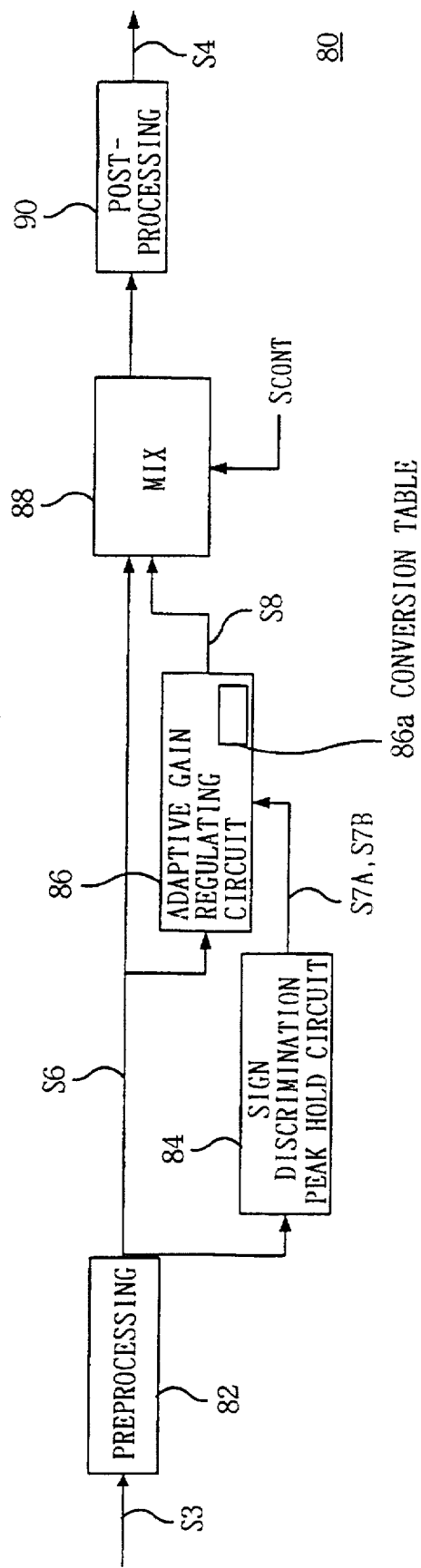
FIG. 10 is a block diagram of the detail signal width compression circuit of FIG. 4 in accordance with another embodiment of the present invention.

FIG. 10 is a block diagram of a detail signal width compression circuit in accordance with another embodiment of the present invention. Detail signal width compression circuit 80 is comprised of a preprocessing circuit 82, a sign discrimination peak hold circuit 84, an adaptive gain regulating circuit 86, a mixing circuit 88 and a postprocessing circuit 90. Circuits 82, 88 and 90 operate in a manner similar to preprocessing circuit 62, mixing circuit 68 and postprocessing circuit 70, respectively, shown in FIG. 5 of the drawings, and further description thereof is not repeated herein.

Figure 7:
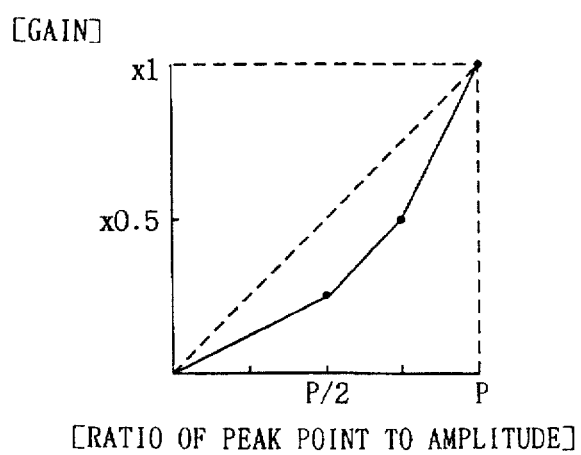
FIG. 7 is a graph of gain values for particular amplitude ratios used in the adaptive gain regulating circuit of FIG. 5.

Sign discrimination peak hold circuit 84 detects separate maximum positive and negative amplitude levels of plural samples of detail signal S6 supplied thereto, further discussed below, and supplies to adaptive gain regulating circuit 86 a maximum positive amplitude level S7A and a maximum negative amplitude level S7B. Circuit 86, in a preferred embodiment, detects the sign of a sample of detail signal S6 supplied from preprocessing circuit 82, gain-adjusts when the sign of the sample is positive the sample as a function of the ratio of the amplitude level of the sample to the maximum positive amplitude level S7A, and gain-adjusts when the sample's amplitude is negative the sample as a function of the ratio of the amplitude level of the sample signal to the maximum negative amplitude level S7B. Similar to circuit 66, adapative gain regulating circuit 86 utilizes a conversion table 86a, such as shown in FIG. 7. The gain-adjusted signal S8 then is supplied to mixing circuit 88 which operates in a manner previously discussed.

Figure 11:
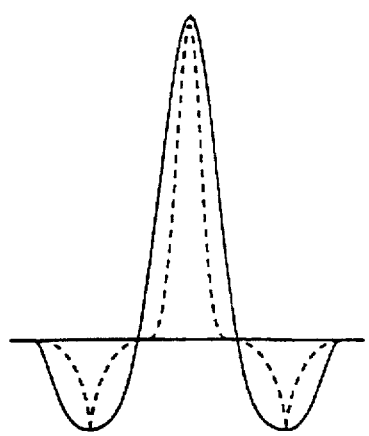
FIG. 11 illustrates waveforms of a detail signal and a modified detail signal having different positive and negative amplitudes.

FIG. 11 illustrates the waveform of a gain-adjusted detail signal S8 (the dashed line) when detail signal S6 (the solid line) has different maximum positive and negative amplitude levels and is gain-adjusted without regard to the sign of the samples. Since the negative samples are subtantially smaller in magnitude than the positive samples in the illustrated example, gain-adjusted negative samples, as will be shown, are virtually useless. To overcome this disadvantageous result, the present invention, such as described with reference to FIG. 10, distinguishes between positive and negative samples.

Figure 12:
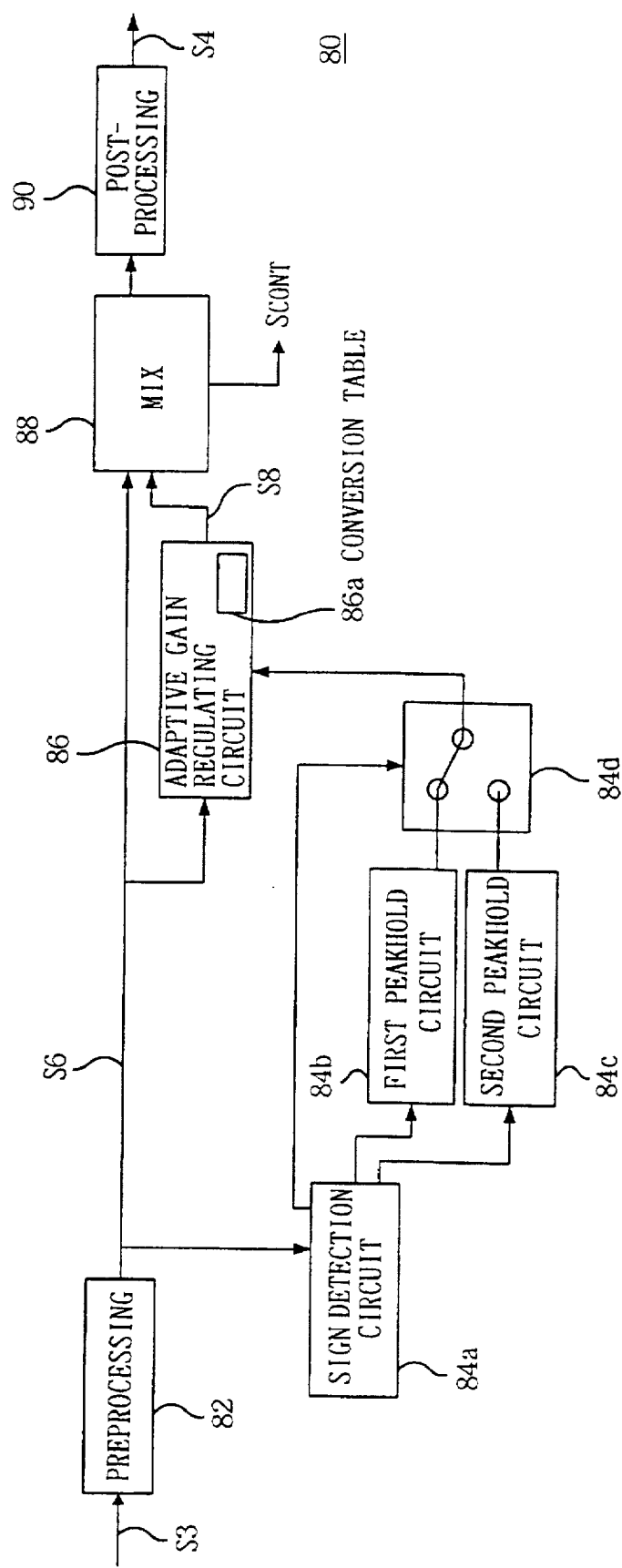
FIG. 12 is a detailed block diagram of the circuit of FIG. 10.

FIG. 12 is a detailed block diagram of another detail signal width compression circuit 80 in accordance with the present invention. As shown, sign discrimination peak hold circuit 84 is comprised of a sign detection circuit 84a, a first peak hold circuit 84b, a second peak hold circuit 84c, and a switch 84d. A sample of detail signal S6 is supplied to sign detection circuit 84a which detects the sign of the sample, supplies the detected sign to switch 84d (to be discussed), and supplies when the sample is positive the amplitude level of that sample to first peak hold circuit 84b, and supplies when the sample is negative the amplitude level to second peak hold circuit 84c. First peak hold circuit 84b operates in a manner similar to peak hold circuit 64, except since only positive amplitude levels are supplied to circuit 84b, the maximum positive amplitude level of the supplied samples is determined. Second peak hold circuit 84c also operates in a manner similar to peak hold circuit 64, but determines the maximum negative amplitude level of the supplied samples. Second peak hold circuit 84c may be identical in construction to first peak hold circuit 84b or, alternatively, both circuits may be included in a single circuit, as is well known in the art.

First and second peak hold circuits 84b and 84c supply their respective outputs to switch 84d which supplies one of those outputs, as determined by the sign of the sample provided by sign detection circuit 84a, to adaptive gain regulating circuit 86. That is, when the sign of a sample of detail signal S6 is positive, first peak hold circuit 84b ascertains the maximum positive amplitude level of plural samples supplied thereto, and switch 84d supplies the maximum positive amplitude level to circuit 86 which then gain-adjusts the sample in the manner previously discussed. Similarly, the amplitude level of a negative sample is supplied to second peak circuit 84c which determines the maximum negative amplitude level, and switch 84c supplies the maximum negative amplitude level to circuit 86.

In an alternative embodiment, adaptive gain regulating circuit 86 includes means for detecting the sign of the supplied sample and utilizing the appropriate maximum amplitude level to gain-adjust the supplied sample, such as described with reference to FIG. 10.

Figure 13A:
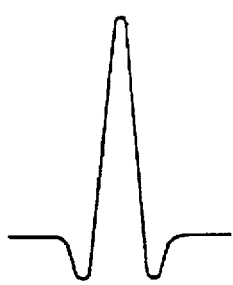
FIGS. 13A to 13C are waveform diagrams showing a detail signal and modified detail signals having different positive and negative amplitudes.
Figure 13B:
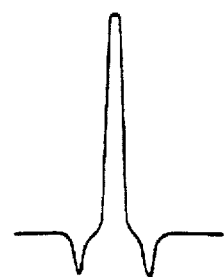
Figure 13C:
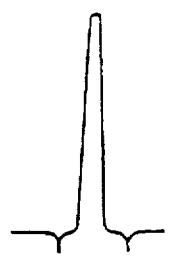

Therefore, when a detail signal having substantially different positive and negative amplitude levels, such as shown in FIG. 13A, is gain-adjusted in accordance with the present invention, adaptive gain regulating circuit 86 gain-adjusts positive and negative samples in accordance with the respective maximum positive and maximum negative amplitude levels to produce the waveform shown in FIG. 13B. If such detail signals were gain-adjusted without regard to the sign of the amplitude levels, the negative amplitudes would be "over"-gain-adjusted to produce a waveform such as shown in FIG. 13C. It is seen, therefore, that the present invention compensates for different positive and negative amplitude levels.

While the present invention has been particularly shown and described in conjunction with preferred embodiments thereof, it will be readily appreciated by those of ordinary skill in the art that various changes may be made without departing from the spirit and scope of the invention. For example, although the present discussion is directed to generating detail signals whose apertures are thin, the present invention is not limited to obtaining this result and may generate appropriately thick-contoured detail signals if such were desired.

As another example, although the present discussion is directed to gain-adjusting a detail signal using the conversion table shown in FIG. 7, other conversion tables or functions such as non-linear curves, may be used by the gain-adjusting circuit described herein.

Still further, although the processing apparatus, as described herein, includes a mixing circuit and a single conversion table (or function), other types of combining devices (or no combining device at all) and multiple conversion tables (or functions) may be included in a device embodying the present invention.

As still another example, although the present discussion is directed to processing video signals output from a camera, other types of video signals, including HDTV signals, may be processed by the video signal processing apparatus described herein.

Therefore, it is intended that the appended claims be interpreted as including the embodiments described herein, the alternatives mentioned above, and all equivalents thereto.

What is claimed is:

1. Apparatus for processing a video signal, comprising:
   detail signal generating means for generating a detail signal from a video signal;

peak detecting means for detecting a maximum amplitude level of a plurality of samples of said detail signal; and modifying means for modifying an amplitude level of one of said samples of said detail signal as a function of the ratio of the amplitude level of said one sample to said detected maximum amplitude level to produce a modified detail signal.

2. The apparatus of claim 1, further comprising means for adding said modified detail signal to said video signal.

3. The apparatus of claim 1, further comprising combining means for combining said modified detail signal and said detail signal generated by said detail signal generating means to produce a second modified detail signal.

4. The apparatus of claim 3, further comprising means for adding said second modified detail signal to said video signal.

5. The apparatus of claim 3, wherein said combining means combines said modified detail signal and said detail signal at a selectable ratio of one to the other.

6. The apparatus of claim 1, wherein said modifying means multiplies said amplitude level of said one sample of said detail signal by a gain coefficient that is a function of the ratio of the amplitude level of said one sample to said detected maximum amplitude level.

7. The apparatus of claim 6, wherein said modifying means includes means for retrieving said gain coefficient from a look-up table as a function of said ratio.

8. The apparatus of claim 1, further comprising image pickup means for receiving an optical image and for generating said video signal therefrom.

9. The apparatus of claim 1, wherein said peak detecting means detects a maximum amplitude level of a predetermined constant number of adjacent samples of said detail signal, said adjacent samples including said one sample of said detail signal modified in said modifying means.

10. The appararatus of claim 1, wherein said detail signal generating means is a high pass filter.

11. Apparatus for processing a video signal, comprising:
   detail signal generating means for generating a detail signal from a video signal;
   positive peak detecting means for detecting a maximum positive amplitude level of a first plurality of samples of said detail signal having positive amplitude levels;
   negative peak detecting means for detecting a maximum negative amplitude level of a second plurality of samples of said detail signal having negative amplitude levels;
   means for determining a polarity of an amplitude level of a sample of said detail signal; and
   modifying means for modifying said amplitude level of said sample as a function of the ratio of the amplitude level of said sample to said detected maximum positive amplitude level when said sample has a positive amplitude level, and as a function of the ratio of the amplitude level of said sample to said detected maximum negative amplitude level when said sample has a negative amplitude level, to produce a modified detail signal.

12. The apparatus of claim 11, further comprising means for adding said modified detail signal to said video signal.

13. The apparatus of claim 11, further comprising combining means for combining said modified detail signal and said detail signal generated by said detail signal generating means to produce a second modified detail signal.

14. The apparatus of claim 13, further comprising means for adding said second modified detail signal to said video signal.

15. The apparatus of claim 13, wherein said combining means combines said modified detail signal and said detail signal at a selectable ratio of one to the other.

16. The apparatus of claim 11, wherein said modifying means multiplies said amplitude level of said sample of said detail signal by a gain coefficient, said gain coefficient being a function of the ratio of the amplitude level of said sample to said detected maximum positive amplitude level when said sample has a positive amplitude level, and being a function of the ratio of the amplitude level of said sample to said detected maximum negative amplitude level when said sample has a negative amplitude level.

17. The apparatus of claim 16, wherein said modifying means includes means for retrieving said gain coefficient from a look-up table as a function of said ratio.

18. The apparatus of claim 11, further comprising image pickup means for receiving an optical image and for generating said video signal therefrom.

19. The apparatus of claim 11, wherein said positive peak detecting means detects a maximum positive amplitude level of first adjacent samples of said detail signal having positive amplitudes, said first adjacent samples including said sample of said detail signal modified in said modifying means when said sample has a positive amplitude level, and said negative peak detecting means detects a maximum negative amplitude level of second adjacent samples of said detail signal having negative amplitudes, said second adjacent samples including said sample of said detail signal modified in said modifying means when said sample has a negative amplitude level.

20. The appararatus of claim 11, wherein said detail signal generating means is a high pass filter.

21. Method of processing a video signal, comprising the steps of:
   generating a detail signal from a video signal;
   detecting a maximum amplitude level of a plurality of samples of said detail signal; and
   modifying an amplitude level of one of said samples of said detail signal as a function of the ratio of the amplitude level of said one sample to said detected maximum amplitude level to produce a modified detail signal.

22. The method of claim 21, further comprising the step of adding said modified detail signal to said video signal.

23. The method of claim 21, further comprising the step of combining said modified detail signal and said detail signal to produce a second modified detail signal.

24. The method of claim 23, further comprising the step of adding said second modified detail signal to said video signal.

25. The method of claim 23, wherein the combining step is carried out by combining said modified detail signal and said detail signal at a selectable ratio of one to the other.

26. The method of claim 21, wherein said modifying step is carried out by multiplying said amplitude level of said one sample of said detail signal by a gain coefficient that is a function of the ratio of the amplitude level of said one sample to said detected maximum amplitude level.

27. The method of claim 26, wherein said modifying step includes the step of retrieving said gain coefficient from a look-up table as a function of said ratio.

28. The method of claim 21, further comprising the steps of receiving an optical image and generating said video signal from said optical image.

29. The method of claim 21, wherein said detecting step is carried out by detecting a maximum amplitude level of a predetermined constant number of adjacent samples of said detail signal, said adjacent samples including said one sample of said detail signal modified in said modifying step.

30. The method of claim 21, wherein said step of generating a detail signal is carried out by extracting high frequency components of said video signal to produce said detail signal.

31. Method of processing a video signal, comprising the steps of:

generating a detail signal from a video signal;

detecting a maximum positive amplitude level of a first plurality of samples of said detail signal having positive amplitude levels;

detecting a maximum negative amplitude level of a second plurality of samples of said detail signal having negative amplitude levels;

determining a polarity of an amplitude level of a sample of said detail signal; and modifying said amplitude level of said sample as a function of the ratio of the amplitude level of said sample to said detected maximum positive amplitude level when said sample has a positive amplitude level, and as a function of the ratio of the amplitude level of said sample to said detected maximum negative amplitude level when said sample has a negative amplitude level, to produce a modified detail signal.

32. The method of claim 31, further comprising the step of adding said modified detail signal to said video signal.

33. The method of claim 31, further comprising the step of combining said modified detail signal and said detail signal to produce a second modified detail signal.

34. The method of claim 33, further comprising the step of adding said second modified detail signal to said video signal.

35. The method of claim 33, wherein said combining step is carried out by combining said modified detail signal and said detail signal at a selectable ratio of one to the other.

36. The method of claim 31, wherein said modifying step is carried out by multiplying said amplitude level of said sample of said detail signal by a gain coefficient, said gain coefficient being a function of the ratio of the amplitude level of said sample to said detected maximum positive amplitude level when said sample has a positive amplitude level, and being a function of the ratio of the amplitude level of said sample to said detected maximum negative amplitude level when said sample has a negative amplitude level.

37. The method of claim 36, wherein said modifying step includes the step of retrieving said gain coefficient from a look-up table as a function of said ratio.

38. The method of claim 31, further comprising the steps of receiving an optical image and generating said video signal from said optical image.

39. The method of claim 31, wherein said step of detecting a maximum positive amplitude level is carried out by detecting a maximum positive amplitude level of first adjacent samples of said detail signal having positive amplitudes, said first adjacent samples including said sample of said detail signal modified in said modifying step when said sample has a positive amplitude level; and said step of detecting a maximum negative amplitude level is carried out by detecting a maximum negative amplitude level of second adjacent samples of said detail signal having negative amplitudes, said second adjacent samples including said sample of said detail signal modified in said modifying step when said sample has a negative amplitude level.

40. The method of claim 31, wherein said step of generating a detail signal is carried out by extracting high frequency components of said video signal to produce said detail signal.

* * * * *